United States Patent
Mitra et al.

(10) Patent No.: US 10,117,000 B2
(45) Date of Patent: Oct. 30, 2018

(54) METHOD AND SYSTEM FOR HARDWARE AGNOSTIC DETECTION OF TELEVISION ADVERTISEMENTS

(71) Applicant: Silveredge Technologies Pvt. Ltd., Gurgaon (IN)

(72) Inventors: Debasish Mitra, Gurgaon (IN); Hitesh Chawla, Gurgaon (IN)

(73) Assignee: Silveredge Technologies Pvt. Ltd., Gurgaon (IN)

( * ) Notice: Subject to any disclaimer, the term of this patent is extended or adjusted under 35 U.S.C. 154(b) by 0 days.

(21) Appl. No.: 15/454,730

(22) Filed: Mar. 9, 2017

(65) Prior Publication Data
US 2017/0264970 A1    Sep. 14, 2017

(30) Foreign Application Priority Data
Mar. 10, 2016 (IN) .............................. 201611008438

(51) Int. Cl.
| | |
|---|---|
| *H04H 60/32* | (2008.01) |
| *H04N 21/81* | (2011.01) |
| *H04N 21/439* | (2011.01) |
| *H04N 21/44* | (2011.01) |
| *H04N 21/466* | (2011.01) |
| *H04N 21/442* | (2011.01) |
| *H04N 21/485* | (2011.01) |

(52) U.S. Cl.
CPC ....... *H04N 21/812* (2013.01); *H04N 21/4394* (2013.01); *H04N 21/442* (2013.01); *H04N 21/44008* (2013.01); *H04N 21/466* (2013.01); *H04N 21/4858* (2013.01)

(58) Field of Classification Search
CPC ............. H04N 21/812; H04N 21/4394; H04N 21/44008; H04N 21/442; H04N 21/466; H04N 21/4858
USPC ................................................ 725/19, 18, 22
See application file for complete search history.

(56) References Cited

U.S. PATENT DOCUMENTS

| | | | |
|---|---|---|---|
| 9,258,604 B1 * | 2/2016 | Bilobrov ............ | H04N 21/4586 |
| 9,460,204 B2 * | 10/2016 | Larsen ................ | H04H 60/375 |
| 9,549,162 B2 * | 1/2017 | Yoshida ............. | G06K 9/00744 |
| 9,584,844 B2 * | 2/2017 | Onno ................. | H04N 21/4307 |
| 9,843,656 B2 * | 12/2017 | Eswaran .............. | H04L 69/40 |
| 9,866,925 B2 * | 1/2018 | Harrison ............ | H04N 21/8358 |
| 2003/0023486 A1 * | 1/2003 | Pavelka ................ | G06Q 30/02 |
| | | | 705/14.56 |

(Continued)

*Primary Examiner* — Nnenna Ekpo
(74) *Attorney, Agent, or Firm* — Kolisch Hartwell, P.C.

(57) ABSTRACT

A system and method for hardware agnostic detection of one or more advertisements broadcasted across one or more channels includes extracting a first set of audio fingerprints and a first set of video fingerprints. The method also includes generating a set of digital signature values corresponding to an extracted set of video fingerprints, and normalizing each frame of a pre-determined number of frames of a video. The method also includes scaling each frame of the corresponding pre-determined number of frames of the video clip to a pre-defined scale. Each frame corresponds to the broadcasted media content on the channel. The method also includes trimming a first pre-defined region and a second pre-defined region of each frame by a pre-defined percentage of a frame width, a frame height and a pre-defined number of pixels in each frame.

20 Claims, 6 Drawing Sheets

(56) References Cited

U.S. PATENT DOCUMENTS

| | | | |
|---|---|---|---|
| 2013/0042262 A1* | 2/2013 | Riethmueller | G06F 17/30846 725/14 |
| 2014/0115627 A1* | 4/2014 | Lee | H04N 21/812 725/34 |
| 2014/0282673 A1* | 9/2014 | Neumeier | H04N 21/44008 725/19 |
| 2015/0003739 A1* | 1/2015 | Cho | G06K 9/00718 382/195 |
| 2015/0181311 A1* | 6/2015 | Navin | H04N 21/812 725/34 |

* cited by examiner

METHOD AND SYSTEM FOR HARDWARE AGNOSTIC DETECTION OF TELEVISION ADVERTISEMENTS

INTRODUCTION

The present invention relates to a field of digital fingerprinting of media content and, in particular, relates to a hardware agnostic detection of advertisements using digital audio and video fingerprinting.

A channel broadcast essentially consists of scheduled programs and sponsored advertisements. These broadcasted programs and advertisements are broadcasted through several transmitting devices. In addition, the programs and the advertisements are compressed and encoded before their broadcast. The broadcasted program and advertisements suffers many types of attenuations and noises. Also, these broadcasted programs and advertisements are decoded and decompressed on a set top box. The decoding quality and efficiency of each set top box is different. In addition, multiple channels record their programs in different contrast and brightness settings. Thus, it becomes impossible for advertisement detection system that employs digital fingerprinting to detect same advertisements across multiple channels. Instead, these systems consider same advertisements on multiple channels as different advertisements. These systems detect repeated advertisement as new advertisement. Thus, there is a need for a hardware agnostic detection of advertisements across channels.

Traditionally, these advertisements are detected through a supervised machine learning based approach and an unsupervised machine learning based approach. The unsupervised machine learning based approach focuses on detection of advertisements by extracting and analyzing digital fingerprints of each advertisement. Similarly, the supervised machine learning based approach focuses on mapping and matching digital fingerprints of each advertisement with a known set of digital fingerprints of corresponding advertisement.

In US Patent Publication No. 2013/0042262 A1, a method is disclosed. The method includes receiving a broadcast media sequence; comparing broadcast media sequence and a reference media sequence; generating broadcast information related to the broadcast media sequence based on the comparison of the broadcast media sequence and the reference media sequence; and providing interactivity related to the broadcast media sequence to at least one viewer based on the broadcast information.

The present systems and methods have several disadvantages. Most of the methods and system rely on supervised detection of repeated advertisements. These methods and systems do not take into account the dependency of hardware on the characteristics of the media content. Also, these methods and systems do not take into account the different types of set top boxed used for broadcasting the media content. This results in inaccurate detection of the advertisements which leads to loss of revenue and wastage of time. Also, these methods and systems do not consider the uniqueness in signal quality and luminous value. In addition, these prior arts lack the precision and accuracy to differentiate programs from advertisements. These prior arts lack any approach and technique for unsupervised detection of any new advertisements.

In light of the above stated discussion, there is a need for a method and system which overcomes the above stated disadvantages.

SUMMARY

In an aspect, the present disclosure provides a method for a hardware agnostic detection of one or more advertisements broadcasted across one or more channels. The method includes a step of extraction of a first set of audio fingerprints and a first set of video fingerprints. The method includes another step of generation of a set of digital signature values corresponding to an extracted set of video fingerprints. The method includes yet another step of normalizing each frame of a pre-determined number of frames of a video. The video corresponds to broadcasted media content on a channel. The method includes yet another step of scaling each frame of the corresponding pre-determined number of frames of the video clip to a pre-defined scale. Each frame corresponds to the broadcasted media content on the channel. The method includes yet another step of trimming a first pre-defined region and a second pre-defined region of each frame by a pre-defined percentage of a frame width, a frame height and a pre-defined number of pixels in each frame. The first set of audio fingerprints and the second set of audio fingerprints correspond to each trimmed frame of a pre-defined number of frames corresponding to the media content broadcasted on the channel. The first set of audio fingerprints and the first set of video fingerprints are extracted sequentially in real time. The generation of each digital signature value of the set of digital signature values is done by dividing each prominent frame of the one or more prominent frames into a pre-defined number of blocks. Further, each block of each prominent frame of the one or more prominent frames is gray scaled. Furthermore, the generation of each digital signature value of the set of digital signature values is done by calculating a first bit value and a second bit value for each block of the prominent frame. In addition, the generation of each digital signature value of the set of digital signature values is done by obtaining a 32 bit digital signature value corresponding to each prominent frame. Each block of the pre-defined number of block has a pre-defined number of pixels. The first bit value and the second bit value is calculated from comparison of a mean and a variance for the pre-defined number of pixels in each block of the prominent frame with a corresponding mean and variance for a master frame. The corresponding mean and variance for the master frame is present in the master database. The 32 bit digital signature value is obtained by sequentially arranging the first bit value and the second bit value for each block of the pre-defined number of blocks of the prominent frame. The normalization of each frame is done based on histogram normalization and histogram equalization. The normalization of each frame is done by adjusting luminous intensity value of each pixel to a desired luminous intensity value. The scaling of each frame is done by keeping a constant aspect ratio. The trimming of each frame is done based on calculation of a pre-determined height and a pre-determined width. The pre-determined height and the pre-determined width correspond to the first pre-defined region having a channel logo and the second pre-defined region having a ticker.

In an embodiment of the present disclosure, the pre-defined scale of each frame is 640×480 pixels.

In an embodiment of the present disclosure, the pre-defined percentage of the frame width, the frame height and the pre-defined number of pixels is 30 percent.

In an embodiment of the present disclosure, the first bit value and the second bit value are assigned a binary 0 when the mean and the variance for each block of the prominent frame is less than the corresponding mean and variance of each master frame.

In another embodiment of the present disclosure, the first bit value and the second bit value are assigned a binary 1 when the mean and the variance for each block of the prominent frame is greater than the corresponding mean and variance of each master frame.

In an embodiment of the present disclosure, the method includes yet another step of detection of the one or more advertisements broadcasted on the channel. The detection of the one or more advertisement is supervised detection and unsupervised detection.

In an embodiment of the present disclosure, the unsupervised detection of the one or more advertisements is done through one or more steps. The one or more steps includes a step of probabilistically matching a first pre-defined number of digital signature values of a real time broadcasted media content with a stored set of digital signature values present in the first database and the second database. The first pre-defined number of digital signature values corresponds to a pre-defined number of prominent frames. Further, the one or more steps include a step of a comparison of one or more prominent frequencies and one or more prominent amplitudes of an extracted first set of audio fingerprints. The one or more steps further include a step of determination of a positive probabilistic match of the pre-defined number of prominent frames based on a pre-defined condition. Furthermore, the one or more steps include a step of fetching of a video and an audio clip corresponding to a probabilistically matched digital signature values. The one or more steps further include a step of checking for presence of the audio and the video clip manually in the master database. In addition, the one or more steps includes a step of reporting a positively matched digital signature values corresponding to an advertisement of the one or more advertisement in a reporting database present in the first database. The probabilistic match is performed for the set of digital signature values by utilizing a temporal recurrence algorithm.

In an embodiment of the present disclosure, the pre-defined condition includes a pre-defined range of positive matches corresponding to probabilistically matched digital signature values, a pre-defined duration of media content corresponding to the positive match. In addition, the pre-defined condition includes a sequence and an order of the positive matches and a degree of positive match of a pre-defined range of number of bits of the first pre-defined number of signature values.

In an embodiment of the present disclosure, the method includes yet another step of updation of a first metadata comprising the set of digital signature values and the first set of video fingerprints with the processor. The set of digital signature values and the first set of video fingerprints correspond to a detected advertisement and updated manually in the master database for the unsupervised detection.

In an embodiment of the present disclosure, the supervised detection of the one or more advertisements is done through one or more steps. The one or more steps includes a step of probabilistically matching a second pre-defined number of digital signature values corresponding to a pre-defined number of prominent frames of a real time broadcasted media content with a stored set of digital signature values. The stored set of digital signature values is present in the master database. Further, the one or more steps includes a step of comparing the one or more prominent frequencies and the one or more prominent amplitudes corresponding to the extracted first set of audio fingerprints with a stored one or more prominent frequencies and a stored one or more prominent amplitudes. Furthermore, the one or more steps include a determination of the positive match in the probabilistically matching of the second pre-defined number of digital signature values with the stored set of digital signature values in the master database. In addition, the one or more steps includes a step of comparing the one or more prominent frequencies and the one or more prominent amplitudes corresponding to the extracted first set of audio fingerprints with the stored one or more prominent frequencies and the stored one or more prominent amplitudes. The probabilistic match being performed for the set of digital signature values by utilizing a sliding window algorithm.

In another aspect, the present disclosure provides a computer system. The computer system includes one or more processors and a memory. The memory is coupled to the one or more processors. The memory is used to store instructions. The instructions in the memory when executed by the one or more processors cause the one or more processors to perform a method. The one or more processors perform the method for a hardware agnostic detection of one or more advertisements broadcasted across one or more channels. The method includes a step of extraction of a first set of audio fingerprints and a first set of video fingerprints. The method includes another step of generation of a set of digital signature values corresponding to an extracted set of video fingerprints. The method includes yet another step of normalizing each frame of a pre-determined number of frames of a video. The video corresponds to broadcasted media content on a channel. The method includes yet another step of scaling each frame of the corresponding pre-determined number of frames of the video clip to a pre-defined scale. Each frame corresponds to the broadcasted media content on the channel. The method includes yet another step of trimming a first pre-defined region and a second pre-defined region of each frame by a pre-defined percentage of a frame width, a frame height and a pre-defined number of pixels in each frame. The first set of audio fingerprints and the second set of audio fingerprints correspond to each trimmed frame of a pre-defined number of frames corresponding to the media content broadcasted on the channel. The first set of audio fingerprints and the first set of video fingerprints are extracted sequentially in real time. The generation of each digital signature value of the set of digital signature values is done by dividing each prominent frame of the one or more prominent frames into a pre-defined number of blocks. Further, each block of each prominent frame of the one or more prominent frames is gray scaled. Furthermore, the generation of each digital signature value of the set of digital signature values is done by calculating a first bit value and a second bit value for each block of the prominent frame. In addition, the generation of each digital signature value of the set of digital signature values is done by obtaining a 32 bit digital signature value corresponding to each prominent frame. Each block of the pre-defined number of block has a pre-defined number of pixels. The first bit value and the second bit value is calculated from comparison of a mean and a variance for the pre-defined number of pixels in each block of the prominent frame with a corresponding mean and variance for a master frame. The corresponding mean and variance for the master frame is present in the master database. The 32 bit digital signature value is obtained by sequentially arranging the first bit value and the second bit value for each block of the pre-defined number of blocks of the prominent frame. The normalization of each frame is done based on histogram normalization and histogram equalization. The normalization of each frame is done by adjusting luminous intensity value of each pixel to a desired luminous intensity value. The scaling of each frame is done by keeping a constant aspect ratio. The trimming of each frame is done based on calculation of a pre-determined height and a pre-determined width. The pre-determined height and the pre-determined width correspond to the first pre-defined region having a channel logo and the second pre-defined region having a ticker.

In yet another aspect, the present disclosure provides a computer-readable storage medium. The computer readable storage medium enables encoding of computer executable instructions. The computer executable instructions when executed by at least one processor perform a method. The at least one processor performs the method for a hardware agnostic detection of one or more advertisements broadcasted across one or more channels. The method includes a step of extraction of a first set of audio fingerprints and a first set of video fingerprints. The method includes another step of generation of a set of digital signature values corresponding to an extracted set of video fingerprints. The method includes yet another step of normalizing each frame of a pre-determined number of frames of a video. The video corresponds to broadcasted media content on a channel. The method includes yet another step of scaling each frame of the corresponding pre-determined number of frames of the video clip to a pre-defined scale. Each frame corresponds to the broadcasted media content on the channel. The method includes yet another step of trimming a first pre-defined region and a second pre-defined region of each frame by a pre-defined percentage of a frame width, a frame height and a pre-defined number of pixels in each frame. The first set of audio fingerprints and the second set of audio fingerprints correspond to each trimmed frame of a pre-defined number of frames corresponding to the media content broadcasted on the channel. The first set of audio fingerprints and the first set of video fingerprints are extracted sequentially in real time. The generation of each digital signature value of the set of digital signature values is done by dividing each prominent frame of the one or more prominent frames into a pre-defined number of blocks. Further, each block of each prominent frame of the one or more prominent frames is gray scaled. Furthermore, the generation of each digital signature value of the set of digital signature values is done by calculating a first bit value and a second bit value for each block of the prominent frame. In addition, the generation of each digital signature value of the set of digital signature values is done by obtaining a 32 bit digital signature value corresponding to each prominent frame. Each block of the pre-defined number of block has a pre-defined number of pixels. The first bit value and the second bit value is calculated from comparison of a mean and a variance for the pre-defined number of pixels in each block of the prominent frame with a corresponding mean and variance for a master frame. The corresponding mean and variance for the master frame is present in the master database. The 32 bit digital signature value is obtained by sequentially arranging the first bit value and the second bit value for each block of the pre-defined number of blocks of the prominent frame. The normalization of each frame is done based on histogram normalization and histogram equalization. The normalization of each frame is done by adjusting luminous intensity value of each pixel to a desired luminous intensity value. The scaling of each frame is done by keeping a constant aspect ratio. The trimming of each frame is done based on calculation of a pre-determined height and a pre-determined width. The pre-determined height and the pre-determined width correspond to the first pre-defined region having a channel logo and the second pre-defined region having a ticker.

BRIEF DESCRIPTION OF THE DRAWINGS

Figure 1A:
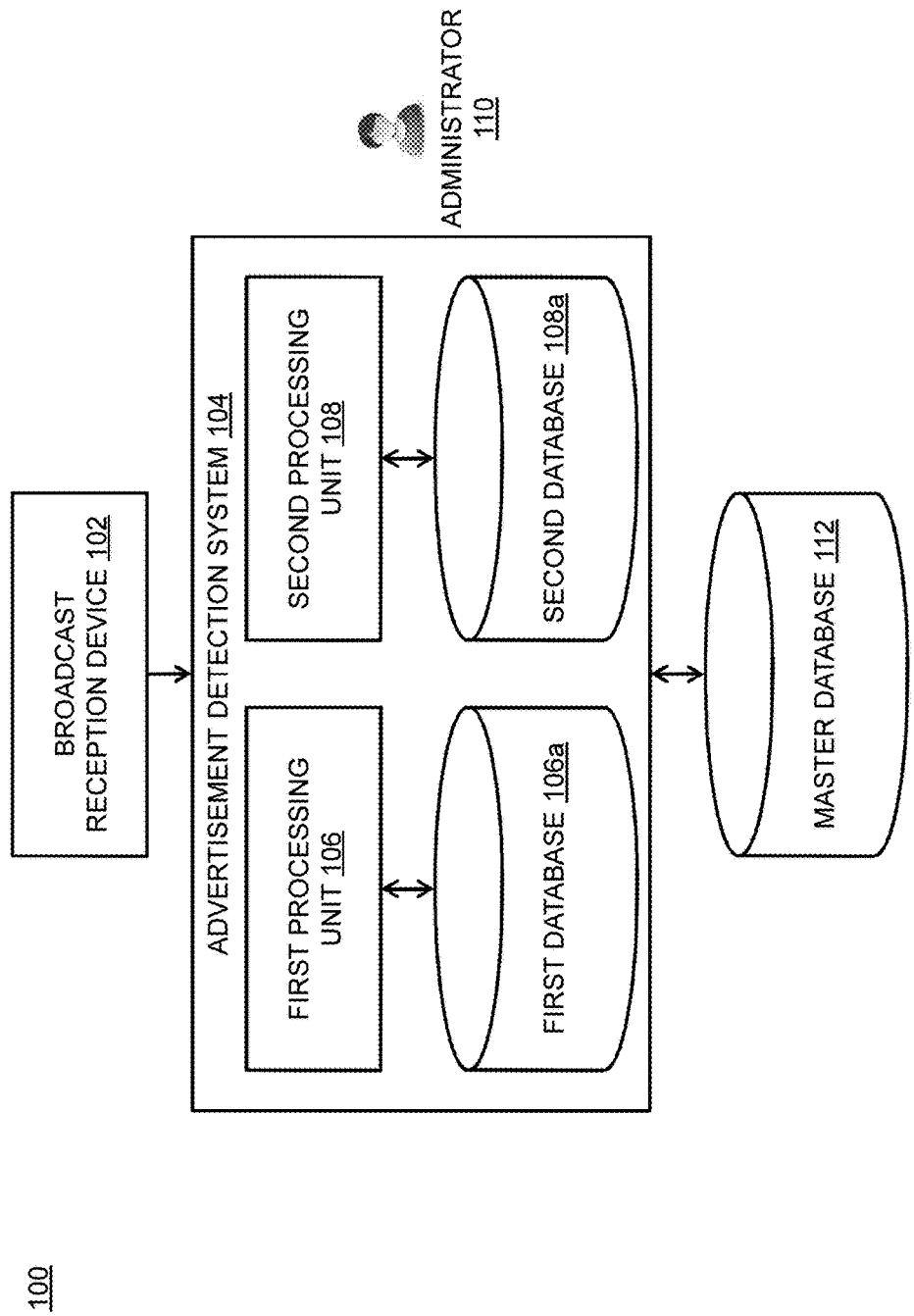
Figure 1B:
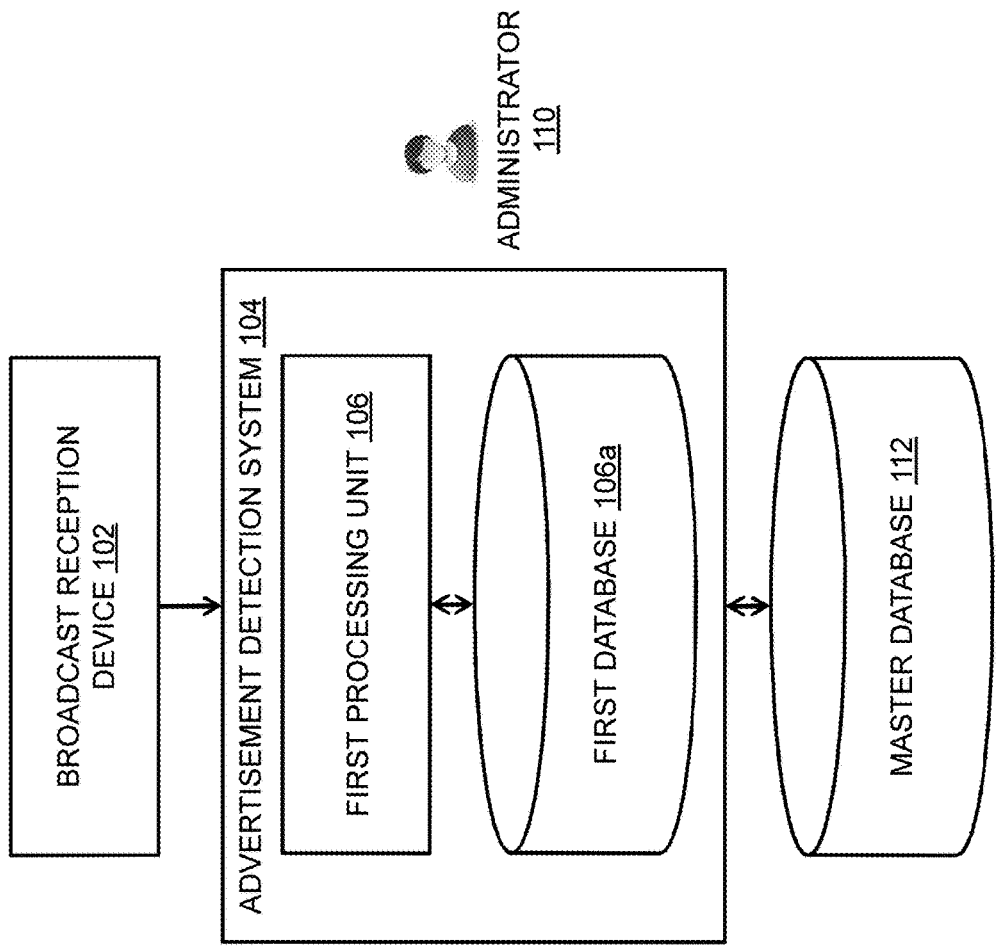
Figure 1C:
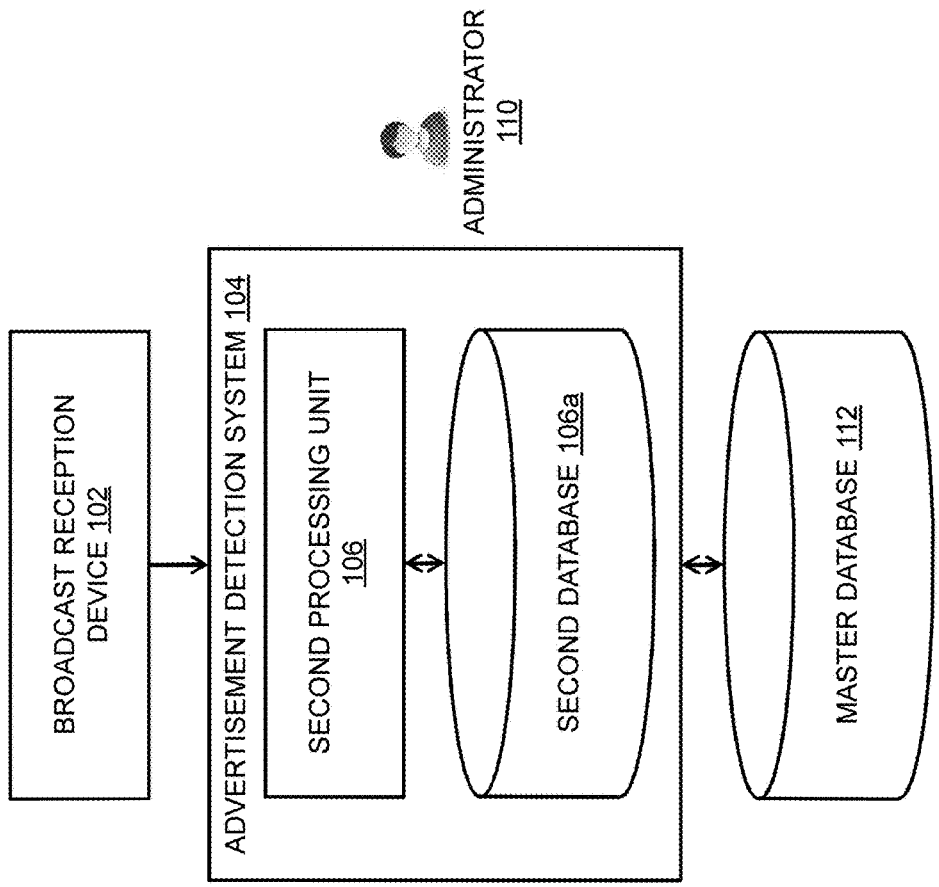
Figure 2:
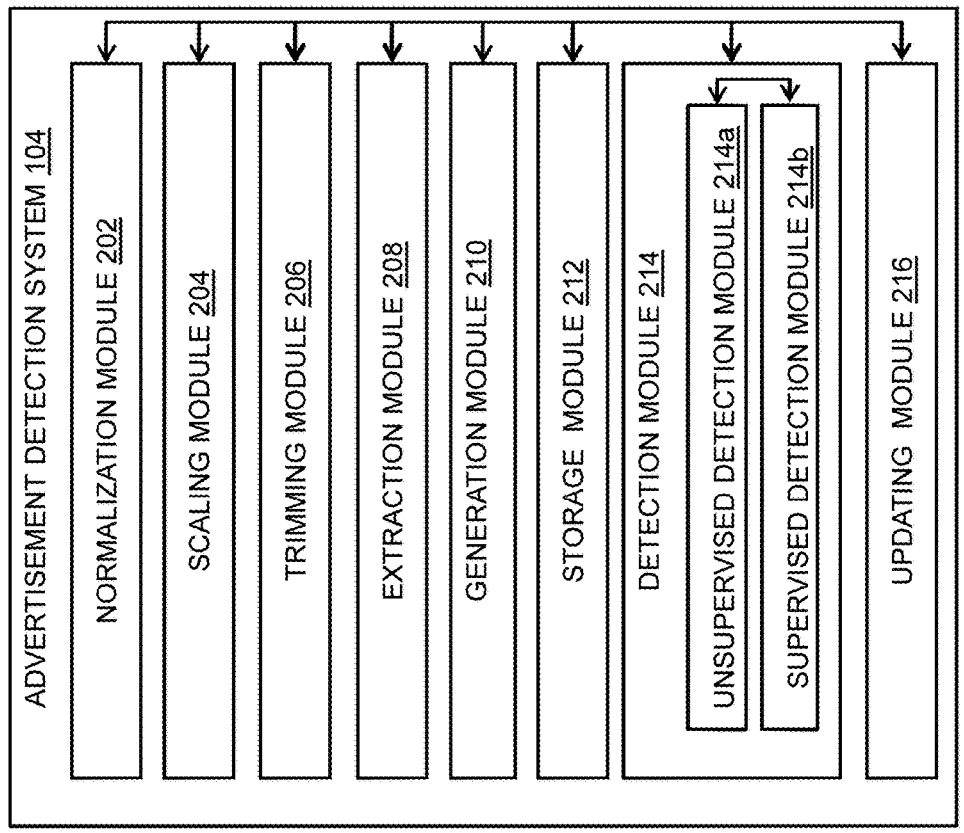
Figure 3:
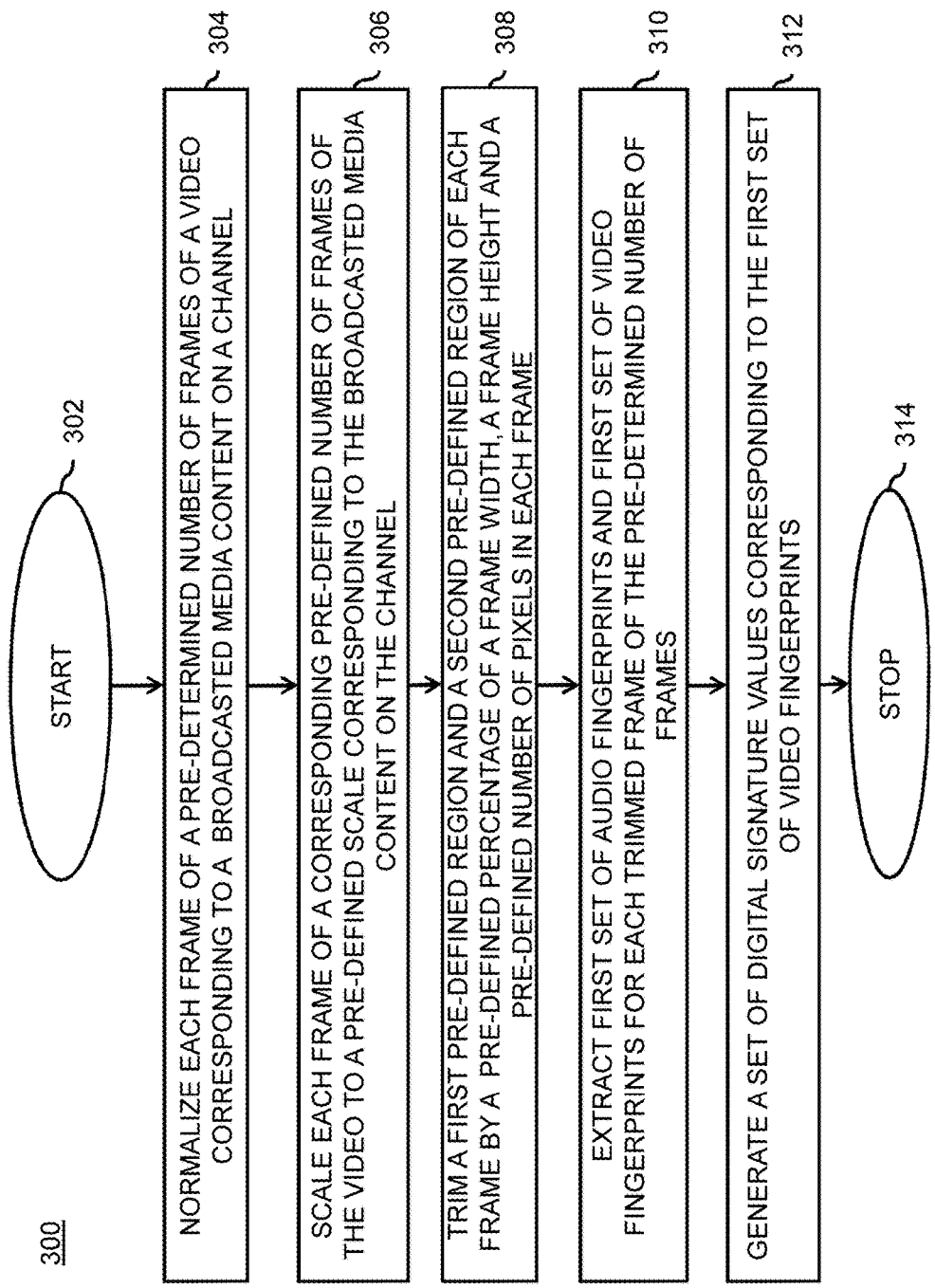
Figure 4:
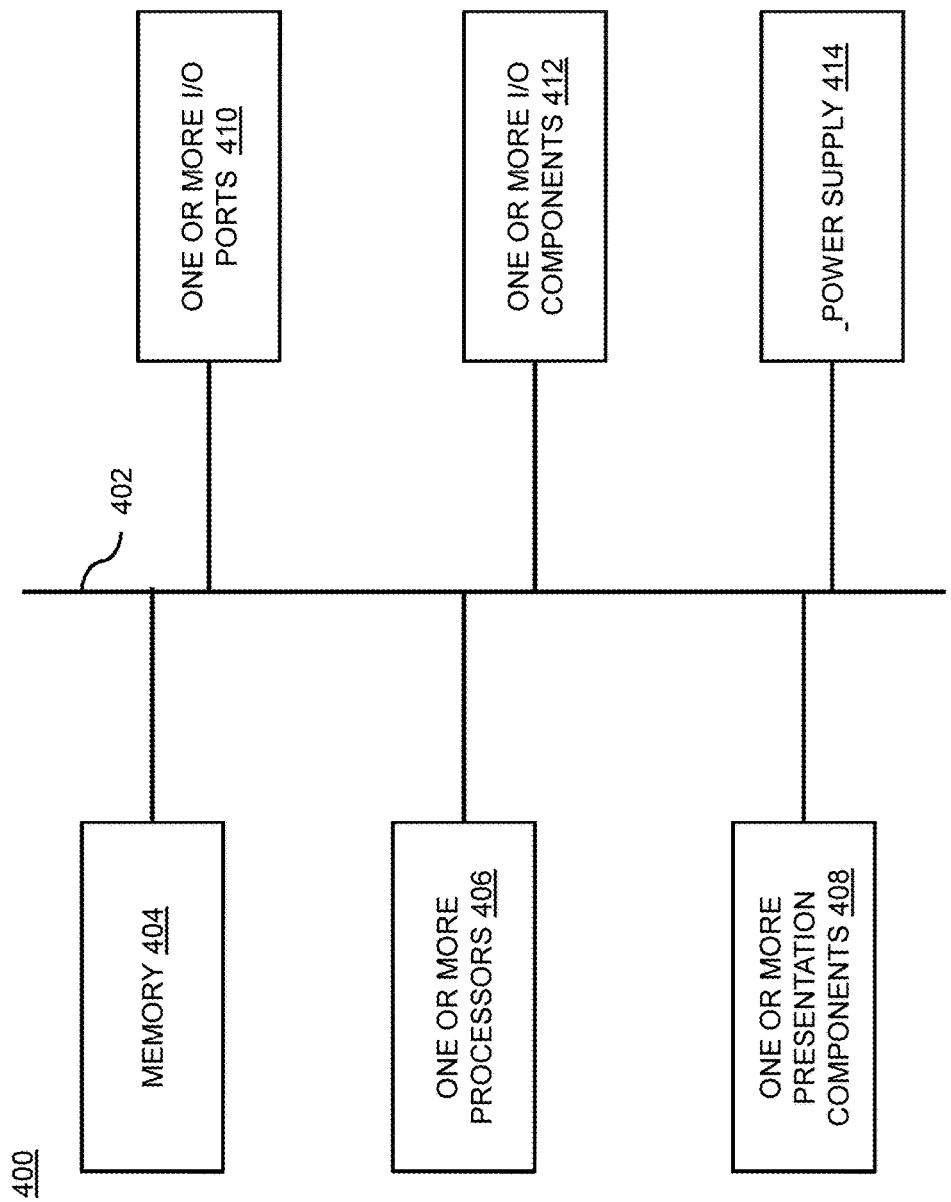

Having thus described the invention in general terms, reference will now be made to the accompanying drawings, which are not necessarily drawn to scale, and wherein:

FIG. 1A illustrates a system for a hardware agnostic detection of one or more advertisements broadcasted across one or more channels, in accordance with various embodiments of the present disclosure;

FIG. 1B illustrates a system for an unsupervised detection of the one or more advertisements broadcasted across the one or more channels, in accordance with an embodiment of the present disclosure;

FIG. 1C illustrates a system for a supervised detection of the one or more advertisements broadcasted across the one or more channels, in accordance with another embodiment of the present disclosure;

FIG. 2 illustrates a block diagram of an advertisement detection system, in accordance with various embodiments of the present disclosure;

FIG. 3 illustrates a flow chart for the hardware agnostic detection of the one or more advertisements broadcasted across the one or more channels, in accordance with various embodiments of the present disclosure; and FIG. 4 illustrates a block diagram of a computing device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1A illustrates a system 100 for a hardware agnostic detection of one or more advertisements broadcasted across one or more channels, in accordance with various embodiments of the present disclosure. The system 100 describes an environment suitable for an interactive reception and processing of a channel broadcast. The system 100 is configured to provide a setup for detection of the one or more advertisements. In addition, the system 100 performs a supervised and an unsupervised detection of the one or more advertisements broadcasted across one or more channels.

The system 100 includes a broadcast reception device 102, an advertisement detection system 104 and a master database 112. The above stated elements of the system 100 operate coherently and synchronously to perform the hardware agnostic detection of the one or more advertisements broadcasted across the one or more. The hardware agnostic detection corresponds to a hardware independent detection of the one or more advertisements (explained below in the patent application). The broadcast reception device 102 is a channel feed receiving and processing device. The broadcast reception device 102 is attached directly or indirectly to a receiving antenna or dish. The receiving antenna receives a broadcasted signal carrying one or more channel feeds. The one or more channel feeds are encoded in a pre-defined format. In addition, the one or more channel feeds have a set of characteristics. The set of characteristics includes a frame rate, an audio sample rate, one or more frequencies and the like.

The broadcasted signal carrying the one or more channel feeds is initially transmitted from a transmission device. In an embodiment of the present disclosure, the broadcasted signal carrying the one or more channel feeds is a multiplexed MPEG-2 encoded signal having a constant bit rate. In another embodiment of the present disclosure, the broadcasted signal carrying the one or more channel feeds is a multiplexed MPEG-2 encoded signal having a variable bit rate. In yet another embodiment of the present disclosure, the broadcasted signal carrying the one or more channel feeds is any digital standard encoded signal. The bit rate is based on complexity of each frame in each of the one or more channel feeds. The quality of the multiplexed MPEG-2 encoded signal will be reduced when the broadcasted signal is too complex to be coded at a constant bit-rate. The bit rate of the variable bit-rate MPEG-2 streams is adjusted dynamically as less bandwidth is needed to encode the images with a given picture quality. In addition, the broadcasted signal is encrypted for a conditional access to a particular subscriber. The encrypted broadcast signal is uniquely decoded by the broadcast reception device 102 uniquely.

In an example, a digital TV signal is received on the broadcast reception device 102 as a stream of MPEG-2 data. The MPEG-2 data has a transport stream. The transport stream has a data rate of 40 megabits/second for a cable or satellite network. Each transport stream consists of a set of sub-streams. The set of sub-streams is defined as elementary streams. Each elementary stream includes an MPEG-2 encoded audio, an MPEG-2 encoded video and data encapsulated in an MPEG-2 stream. In addition, each elementary stream includes a packet identifier (hereinafter "PID") that acts as a unique identifier for corresponding elementary stream within the transport stream. The elementary streams are split into packets in order to obtain a packetized elementary stream (hereinafter "PES").

In an embodiment of the present disclosure, the broadcast reception device 102 is a digital set top box. In another embodiment of the present disclosure, the broadcast reception device 102 is a hybrid set top box. In yet another embodiment of the present disclosure, the broadcast reception device 102 is any standard broadcast signal processing device. Further, the broadcast reception device 102 may receive the broadcast signal from any broadcast signal medium. In an embodiment of the present disclosure, the broadcast signal medium is an ethernet cable. In another embodiment of the present disclosure, the broadcast signal medium is a satellite dish. In yet another embodiment of the present disclosure, the broadcast signal medium is a coaxial cable. In yet another embodiment of the present disclosure, the broadcast signal medium is a telephone line having DSL connection. In yet another embodiment of the present disclosure, the broadcast signal medium is a broadband over power line (hereinafter "BPL"). In yet another embodiment of the present disclosure, the broadcast signal medium is an ordinary VHF or UHF antenna.

The broadcast reception device 102 primarily includes a signal input port, an audio output port, a video output port, a de-multiplexer, a video decoder, an audio decoder and a graphics engine. The broadcast signal carrying the one or more channel feeds is received at the signal input port. The broadcast signal carrying the one or more channel feeds is de-multiplexed by the de-multiplexer. The video decoder decodes the encoded video and the audio decoder decodes the encoded audio. The video and audio corresponds to a channel selected in the broadcast reception device 102. In general, the broadcast reception device 102 carries the one or more channel feeds multiplexed to form a single transporting stream. The broadcast reception device 102 can decode only one channel in real time.

Further, the decoded audio and the decoded video are received at the audio output port and the video output port. Further, the decoded video has a first set of features. The first set of features includes a frame height, a frame width, a frame rate, a video resolution, a bit rate and the like. Moreover, the decoded audio has a second set of features. The second set of features includes a sample rate, a bit rate, a bin size, one or more data points, one or more prominent frequencies and one or more prominent amplitudes. Further, the decoded video may be of any standard quality. In an embodiment of the present disclosure, the decoded video signal is a 144p signal. In another embodiment of the present disclosure, the decoded video signal is a 240p signal. In yet another embodiment of the present disclosure, the decoded video signal is a 360p signal. In yet another embodiment of the present disclosure, the decoded video signal is a 480p signal. In yet another embodiment of the present disclosure, the decoded video signal is a 720p video signal. In yet another embodiment of the present disclosure, the decoded video signal is a 1080p video signal. In yet another embodiment of the present disclosure, the decoded video signal is a 1080i video signal. Here, p and i denotes progressive scan and interlace scan techniques.

Further, the decoded video and the decoded audio (hereinafter "media content") are transferred to the advertisement detection system 104 through a transfer medium. The transfer medium can be a wireless medium or a wired medium. Moreover, the media content includes one or more television programs, the one or more advertisements, one or more channel related data, subscription related data, operator messages and the like. The media content has a pre-defined frame rate, a pre-defined number of frames and a pre-defined bit rate for a pre-defined interval of broadcast.

Further, the broadcast reception device 102 broadcasts one or more channels on a user end device. The user end device is connected to the broadcast reception device 102. In addition, the connection is done through one or more cables. The one or more cables connect corresponding one or more ports on the user end device with corresponding one or more ports on the broadcast reception device 102. The end user device is any device capable of allowing one or more users to access the one or more channels for watching media content in real time. In an embodiment of the present disclosure, the end user device includes a CRT television, a LED television, a LCD television, a plasma television and the like. In another embodiment of the present disclosure, the end user device is an internet connected television.

Furthermore, each of the one or more channels may be any type of channel of various types of channels. The various types of channels include sports channels, movie channels, news channels, regional channels, music channels and various other types of channels. The broadcast reception device 102 is associated with a media content broadcast enabler. The media content broadcast enabler provides the broadcast reception device 102 to the one or more users. In an embodiment of the present disclosure, the media content broadcast enabler provides the broadcast reception device 102 for allowing the one or more users to access and view the media content on the corresponding user end device. In an embodiment of the present disclosure, the media content broadcast enabler is associated with a company or an organization employed in construction and distribution of a plurality of broadcast reception devices.

Each of the one or more channels is run by a corresponding company or organization. The media content is broadcasted by the one or more channels by using a set of hardware equipments. The set of hardware equipments are positioned in a facility associated with the corresponding company. The facility corresponds to a television station. Each of the set of hardware equipments work coherently for enabling the broadcast of the media content on the corresponding channel. In addition, the set of hardware equipments include IF modulators, IF to channel converters, power transposers, transmitters, digital TV modulator, splitter, filter and the like.

Each channel of the one or more channels uses a unique set of hardware equipments for broadcasting the media content. In an embodiment of the present disclosure, each company uses their own set of equipments for broadcasting the media content. In addition, a quality of the media content depends on a quality of the set of hardware equipments used for broadcasting the media content. In addition, the set of hardware equipments work along with the broadcast reception device 102 for showing the media content on the user end device. In an embodiment of the present disclosure, the broadcast reception device 102 corresponds to the set top box. Further, a type of the set top box include but may not be limited to a cable converter box, the hybrid set top box, a professional set top box and an IPTV set top box.

The broadcast reception device 102 is associated with a media content broadcast enabler. The media content broadcast enabler provides the broadcast reception device 102 to the one or more users. In an embodiment of the present disclosure, the media content broadcast enabler provides the broadcast reception device 102 for allowing the one or more users to access and view the media content on the corresponding user end device. Moreover, the media content broadcast enabler include but may not be limited to DTH (Direct to Home) provider, STB (set top box) provider, cable TV provider and the like. The media content broadcast enabler is associated with a company or an organization employed in construction and distribution of a plurality of broadcast reception devices.

Further, the set top box associated with each company or manufacturer is different. In an embodiment of the present disclosure, a set top box associated with a company is different from a set top box associated with another company. In addition, the difference lies in a quality of the signal broadcasted by the set top box. In an embodiment of the present disclosure, the quality of the signal broadcasted by a set top box is different from the quality of the signal broadcasted by another set top box. In an embodiment of the present disclosure, the difference in the quality is due to a plurality of components used for manufacturing the set top box.

The plurality of components include an antenna, a front panel, a power supply, a processor, a front end, digital decoder, digital storage, a conditional access module, a return path and other peripherals. Further, the digital decoder includes one or more de-multiplexers, an audio decoder, a video decoder, mixer and graphics engine. In addition, the plurality of components is placed inside the set top box. Also, the set top box enables the broadcast of the media content in the real time (as stated above the patent application).

Going further, the media content broadcasted on the one or more channels has a set of characteristics. The set of characteristics correspond to characteristics associated with an audio and a video associated with the media content. Also, the set of characteristics correspond to a plurality of digital fingerprints. The set of characteristics include the frame height, the frame width, the frame rate, the video resolution, the bit rate, the sample rate, the bin size, the one or more data points and the like. Further, the set of characteristics are different for a same media content broadcasted on different channels. Also, the set of characteristics are different for the same media content broadcasted through different broadcasting reception devices.

Further, the set of characteristics are different based on the set of hardware equipments used by an operator associated with each of the one or more channels. Also, the set of characteristics differ based on the set top box used for broadcasting the media content on the user end device. In an embodiment of the present disclosure, the set of hardware equipments bring a variation in the plurality of digital fingerprints associated with a same media content broadcasted on different channels. In an embodiment of the present disclosure, the variation in the plurality of digital fingerprints is noticed when the same media content is broadcasted through different set top boxes.

In an example, media content A is broadcasted on a channel B and a channel C at any point of time. The media content A will have a different set of fingerprints on the channel B and a different set of fingerprints on the channel C. In another example, media content X is broadcasted on a channel Y through a set top box STB1 and the media content is broadcasted on the channel Y through a set top box STB2. In yet another example, an advertisement J with a brightness level L1 and a contrast level C1 is broadcasted on a channel K and the advertisement J with a brightness level L2 and the contrast level C2 is broadcasted on a channel M. Accordingly, the fingerprints of the advertisement J broadcasted on the channel K is different from the fingerprints of the advertisement J broadcasted on the channel M.

The advertisement detection system 104 normalizes a set of fingerprints of the plurality of digital fingerprints associated with the same broadcast on different channels. Also, the advertisement detection system 104 normalizes the set of fingerprints of the plurality of digital fingerprints of the same media content broadcasted through different set top boxes. In an embodiment of the present disclosure, the advertisement detection system 104 adjusts one or more properties of each video frame of the media content in real time. In an embodiment of the present disclosure, the one or more properties correspond to the set of fingerprints associated with a video of the media content (described below in the patent application).

In an embodiment of the present disclosure, the advertisement detection system 104 normalizes the set of fingerprints of the plurality of digital fingerprints for the same media content broadcasted on different channels. The normalization is done for enabling easier detection of the one or more advertisements broadcasted on the one or more channels. In an embodiment of the present disclosure, the advertisement detection system 104 removes the hardware dependency. Further, the normalization is done by analyzing each video frame associated with a video of the media content (explained further below in the patent application).

The advertisement detection system 104 includes a first processing unit 106 and a second processing unit 108. The advertisement detection system 104 has a built in media splitter configured to copy and transmit the media content synchronously to the first processing unit 106 and the second processing unit 108 in the real time. The first processing unit 106 includes a first central processing unit and associated peripherals for unsupervised detection of the one or more advertisements (also shown in FIG. 1B). The first processing unit 106 is connected to a first database 106a.

Further, the first processing unit 106 receives a live feed associated with the media content broadcasted on a channel of the one or more channels. In an embodiment of the present disclosure, the first processing unit 106 receives the live feed associated with the media content broadcasted on each of the one or more channels. Further, the live feed is received in the real time. The media content is a continuous stream of a plurality of video frames. In an embodiment of the present disclosure, the first processing unit 106 receives the continuous stream of the plurality of video frames. The media content includes one or more scheduled programs and the one or more advertisements.

Accordingly, the first processing unit 106 processes the received media content in the real time. In an embodiment of the present disclosure, the first processing unit 106 processes each video frame of the plurality of video frames in the media content. In an embodiment of the present disclosure, the first processing unit 106 analyzes each video frame of the plurality of video frames. Further, each video frame of the plurality of video frames is associated with a set of parameters. The set of parameters correspond to one or more characteristics of each video frame of the plurality of video frames. Also, each video frame of the plurality of video frame is made of various pixels.

In an embodiment of the present disclosure, the first processing unit 106 analyses the one or more characteristics associated with each video frame of the plurality of video frames. The analysis is done in the real time. Also, the analysis is done sequentially. The one or more characteristics analyzed by the first processing unit 106 include a frame height, a frame width, frame rate, value of each color pixel in the video frame and the like. Further, the number of pixels in the corresponding video frame is calculated by multiplying the corresponding frame height with the corresponding frame width.

In an embodiment of the present disclosure, the first processing unit 106 calculates the one or more characteristics of each video frame of the plurality of video frames. In an embodiment of the present disclosure, the one or more characteristics are derived by performing a digital fingerprinting algorithm. The first processing unit 106 performs the digital fingerprinting algorithm on each of the plurality of video frames of the media content in the real time.

In an embodiment of the present disclosure, the one or more characteristics of each video frame of the plurality of video frames are calculated automatically. In another embodiment of the present disclosure, the one or more characteristics are manually derived by the administrator 110 in the real time. In an embodiment of the present disclosure, the administrator 110 determines the frame height and the frame width of each of the plurality of video frames. Accordingly, the administrator 110 calculates the number of pixels by multiplying the frame height with the frame width for each of the plurality of video frames.

In an embodiment of the present disclosure, the calculation is done for performing the normalization for each frame of the plurality of frames (explained below in the patent application). In an embodiment of the present disclosure, the first processing unit 106 calculates a value of red (R), green (G) and blue (B) for each pixel making up the video frame. Accordingly, in an embodiment of the present disclosure, the value of red (R), green (G) and blue (B) for each pixel is stored in the first database 106a. In addition, the value for red (R), green (G) and blue (B) for each pixel is stored on a continuous basis in the first database 106a.

The video corresponds to the broadcasted media content on the channel of the one or more channels. In an embodiment of the present disclosure, the pre-determined number of frames corresponds to the plurality of video frames. In an embodiment of the present disclosure, the first processing unit 106 normalizes each of the plurality of video frames of the video of the media content. The normalization of each frame of the pre-determined number of frames is done in the real time.

In an embodiment of the present disclosure, the first processing unit 106 processes the pre-determined number of frames in a pre-determined interval of broadcast. For example, the first processing unit 106 processes 25 frames in one second. Further, the normalization of each frame of the pre-determined number of frames is done for standardizing the one or more characteristics for each frame of the pre-determined number of frames. The standardization is done by adjusting the one or more characteristics associated with each video frame to a standard set of values for the one or more characteristics.

The standard set of values for the one or more characteristics corresponds to pre-determined values of the one or more characteristics for the normalization of the pre-determined number of frames. In an embodiment of the present disclosure, the standard set of values is pre-stored in the first database 106a. In an embodiment of the present disclosure, the normalization of each frame is done based on histogram normalization and histogram equalization. The normalization of each frame is done by adjusting luminous intensity value of each pixel to a desired luminous intensity value.

The histogram normalization corresponds to normalization of a graph obtained by mapping values of each pixel value in pre-defined bins of values. In an embodiment of the present disclosure, the graph is obtained for each pixel in each frame separately. In another embodiment of the present disclosure, a single graph for each of the pre-determined number of frames is obtained. In an embodiment of the present disclosure, the first processing unit 106 focuses on normalizing the graph for each frame of the pre-determined number of frames.

Further, in an embodiment of the present disclosure, the first processing unit 106 adjusts the red, green and blue values of each pixel in each frame in real time. In addition, the first processing unit 106 adjusts the values in a pre-defined range. Also, the adjustment is done for attaining the desired luminous intensity value. The adjustment is done for enabling the detection of the same one or more advertisements across each of the one or more channels. In an embodiment of the present disclosure, the adjustment is done for bringing the one or more characteristics of each frame on a common platform. The common platform corresponds to the values of red, green and blue of each frame in a common pre-defined range.

In an embodiment of the present disclosure, the pre-defined range is pre-known to the first processing unit 106. The first processing unit 106 checks the values of red, green and blue for each pixel making each frame of the pre-determined number of frames. Accordingly, the first processing unit 106 adjusts the values if the values do not lie in the pre-defined range. The adjustment results in a change in a resolution of each frame of the pre-determined number of frames. In an embodiment of the present disclosure, the first processing unit 106 normalizes the resolution of each frame of the pre-determined number of frames to a standard resolution. Accordingly, the first processing unit 106 stores each normalized frame of the pre-determined number of frames in the first database 106*a*.

Going further, the first processing unit 106 scales each frame of the corresponding pre-determined number of frames of the video to a pre-defined scale. Each frame corresponds to the broadcasted media content on the channel. In addition, the scaling of each frame is done by keeping a constant aspect ratio. In an embodiment of the present disclosure, the pre-defined scale of each frame is 640×480 pixels. In another embodiment of the present disclosure, the pre-defined scale of each frame may vary. Further, the aspect ratio corresponds to a relationship between the frame height and the frame width associated with each corresponding frame of the pre-determined number of frames.

The aspect ratio for each frame of the pre-determined number of frames is a ratio of the frame width to the frame height. Further, the first processing unit 106 determines the frame height and the frame width of each frame of the pre-determined number of frames. Accordingly, the first processing unit 106 trims a first pre-defined region and a second pre-defined region of each frame by a pre-defined percentage of a frame width, a frame height and a pre-defined number of pixels in each frame.

In an embodiment of the present disclosure, the trimming of each frame is done based on calculation of a pre-determined height and a pre-determined width. The pre-determined height and the pre-determined width correspond to the first pre-defined region having a channel logo and the second pre-defined region having a ticker. In addition, the pre-determined height corresponds to the frame height and the pre-determined width corresponds to the frame width. Further, the first pre-defined region corresponds to a top horizontal portion of each frame and the second pre-defined region corresponds to a bottom horizontal portion of each frame. In an embodiment of the present disclosure, the trimming is done based on the pre-defined scale.

The pre-defined percentage of the frame width, the frame height and the pre-defined number of pixels in each frame is determined based on the pre-defined scale. Also, the trimming is done for maintaining the constant aspect ratio. In an embodiment of the present disclosure, the constant aspect ratio is 4:3. In another embodiment of the present disclosure, the constant aspect ratio may vary. In an embodiment of the present disclosure, the pre-defined percentage of the frame width, the frame height and the pre-defined number of pixels is 30 percent. In another embodiment of the present disclosure, the pre-defined percentage of the frame width, the frame height and the pre-defined number of pixels may vary.

Further, the first processing unit 106 trims the first pre-defined region and the second pre-defined region for enabling a common resolution for each frame of the pre-determined number of frames. In an embodiment of the present disclosure, the trimming is done for forming a common area for each frame where the media content is visible. In an embodiment of the present disclosure, the trimming is done for enabling detection of same one or more advertisements across each of the one or more channels. In an embodiment of the present disclosure, the trimming is done for removing the hardware dependency during the detection of the one or more advertisements. Accordingly, the first processing unit 106 stores each of the normalized, scaled and trimmed frame of the pre-determined number of frames in the first database 106*a*.

In an example, the first processing unit 106 determines that a resolution of a frame F is 1280×768 pixels. Accordingly, the first processing unit 106 scales the resolution from 1280×768 pixels to 640×480 pixels. In addition, the first processing unit 106 trims a first pre-defined area A1 and a second pre-defined area A2 of the frame F. The first pre-defined area A1 is trimmed by 30 percent and the second pre-defined area is trimmed by 40 percent. The trimming is done for obtaining the final resolution of 640×480 pixels.

Going further, the first processing unit 106 is programmed to perform extraction of a first set of audio fingerprints and a first set of video fingerprints corresponding to each trimmed frame of the pre-determined number of frames. The pre-determined number of frames corresponds to the media content broadcasted on the channel. The first set of video fingerprints and the first set of audio fingerprints are extracted sequentially in the real time. The extraction of the first set of video fingerprints is done by sequentially extracting one or more prominent fingerprints corresponding to one or more prominent frames present in the media content. The one or more prominent frames correspond to the pre-defined interval of broadcast. In addition, the first processing unit 106 extracts the first set of audio fingerprints and the first set of video fingerprints for each of the normalized, scaled and trimmed frames.

In an embodiment of the present disclosure, the one or more prominent frames correspond to prominent normalized, scaled and trimmed frames. In an embodiment of the present disclosure, the extraction is done immediately after the trimming of each frame of the pre-determined number of frames. In an embodiment of the present disclosure, the extraction is done after the first processing unit 106 selects the one or more prominent frames from the normalized, scaled and trimmed frames.

For example, let the media content be related to a channel say, X. The channel X broadcasts a 1 hour drama show between 10 AM to 11 AM. Suppose the media content is broadcasted on the channel X with a frame rate of 25 frames per second (hereinafter "fps"). Again let us assume that the channel X administrator has placed 5 advertisements in between 1 hour broadcast of the drama show. The first processing unit 106 separates audio and video from the media content corresponding to the drama show in the real time. Further, the first processing unit 106 sets a pre-defined range of time to approximate duration of play of every advertisement. Let us suppose the pre-defined range of time is between 10 seconds to 35 seconds. The first processing unit 106 processes each frame of the pre-defined number of frames of the 1 hour long drama show. The first processing unit 106 filters and selects prominent frames having dissimilar scenes. The first processing unit 106 extracts relevant characteristics corresponding to each prominent frame. The relevant characteristics constitute a digital video fingerprint. Similarly, the first processing unit 106 extracts the first set of audio fingerprints corresponding to the media content.

Furthermore, each of the one or more prominent fingerprints corresponds to a prominent frame having sufficient contrasting features compared to an adjacent prominent frame. For example, let us suppose that the first processing unit 106 select 5 prominent frames per second from 25 frames per second. Each pair of adjacent frames of the 5 prominent frames will have evident contrasting features. The first processing unit 106 generates a set of digital signature values corresponding to the extracted set of video fingerprints. The first processing unit 106 generates each digital signature value of the set of digital signature values by dividing each prominent frame of the one or more prominent frames into a pre-defined number of blocks. In an embodiment of the present disclosure, the pre-defined number of block is 16 (4×4). In another embodiment of the present disclosure, the pre-defined number of blocks is any suitable number. Each block of the pre-defined number of blocks has a pre-defined number of pixels. Each pixel is fundamentally a combination of red (hereinafter "R"), green (hereinafter "G") and blue (hereinafter "B") colors. The colors are collectively referred to as RGB. Each color of a pixel (RGB) has a pre-defined value in a pre-defined range of values. The pre-defined range of values is 0-255.

In an example, the RGB for the pixel has value of 000000. The color of pixel is black. In another example, the RGB for the pixel has a value of FFFFFF (255; 255; 255). The color of the pixel is white. Here, FF is hexadecimal equivalent of decimal, 255. In yet another example, the RGB for the pixel has a value of CCCC00 (204; 204; 0). The color of the pixel is yellow. The first processing unit 106 gray-scales each block of each prominent frame of the one or more prominent frames. The gray-scaling of each block is a conversion of RGB to monochromatic shades of grey color. Here 0 represents black and 255 represents white. Further, the first processing unit 106 calculates a first bit value and a second bit value for each block of the prominent frame. The first bit value and the second bit value are calculated from comparing a mean and a variance for the pre-defined number of pixels in each block of the prominent frame with a corresponding mean and variance for a master frame in the master database 112. The first processing unit 106 assigns the first bit value and the second bit with a binary 0 when the mean and the variance for each block of the prominent frame is less the corresponding mean and variance of each master frame. The first processing unit 106 assigns the first bit value and the second bit value with a binary 1 when the mean and the variance for each block is greater than the corresponding mean and variance of each master frame.

Furthermore, the first processing unit 106 obtains a 32 bit digital signature value corresponding to each prominent frame. The 32 bit digital signature value is obtained by sequentially arranging the first bit value and the second bit value for each block of the pre-defined number of blocks of the prominent frame. The first processing unit 106 stores each digital signature value corresponding to each prominent frame of the one or more prominent frames in the first database 106a. The digital signature value corresponds to the one or more programs and the one or more advertisements. The first processing unit 106 utilizes a temporal recurrence algorithm to detect the one or more advertisements. In temporal recurrence algorithm, the first processing unit 106 probabilistically matches a first pre-defined number of digital signature values with a stored set of digital signature values present in the first database 106a. In an embodiment of the present disclosure, the matching is done after the trimming is complete for each frame.

In an example, let us suppose that the first processing unit 106 generates 100 digital signature values corresponding to 100 prominent frames in the first database 106a. The first processing unit 106 probabilistically matches 20 digital signature values corresponding to $101^{st}$ to $121^{st}$ prominent frame with each 20 digital signature values corresponding to 100 previously stored prominent frames.

The probabilistic match of the first pre-defined number of digital signature values sequentially for each of the prominent frame is performed by utilizing a sliding window algorithm. In an embodiment of the present disclosure, the first pre-defined number of digital signature values of the set of digital signature values for the unsupervised detection of the one or more advertisements is 20. The first processing unit 106 determines a positive probabilistic match of the pre-defined number of prominent frames based on a pre-defined condition. The pre-defined condition includes a pre-defined range of positive matches corresponding to probabilistically match digital signature values and a pre-defined duration of media content corresponding to the positive match. In addition, the pre-defined condition includes a sequence and an order of the positive matches and a degree of match of a pre-defined range of number of bits of the first pre-defined number of signature values. In an embodiment of the present disclosure, the pre-defined range of probabilistic matches corresponding to the positive match lies in a range of 40 matches to 300 matches. In another embodiment of the present disclosure, the pre-defined range of range of probabilistic matches corresponding to the positive match lies in a suitable duration of each advertisement running time. In an embodiment of the present disclosure, the first processing unit 106 discards the probabilistic matches corresponding to less than 40 positive matches.

Further, the pre-defined duration of media content corresponding to the positive match has a first limiting duration bounded by a second limiting duration. In an embodiment of the present disclosure, the first limiting duration is 10 seconds and the second limiting duration is 25 seconds. In another embodiment of the present disclosure, the first limiting duration is 10 seconds and the second limiting duration is 35 seconds. In yet another embodiment of the present disclosure, the first limiting duration is 10 seconds and the second limiting duration is 60 seconds. In yet another embodiment of the present disclosure, the first limiting duration is 10 seconds and the second limiting duration is 90 seconds. In yet another embodiment of the present disclosure, the first limiting duration and the second limiting duration may have any suitable limiting durations.

In an example, suppose 100 digital signature values from $1000^{th}$ prominent frame to 1100th prominent frame gives a positive match with a stored $100^{th}$ frame to $200^{th}$ frame in the first database 106a. The first processing unit 106 checks whether the number of positive matches in the pre-defined range of positive matches and the positive matches correspond to media content in the first limiting duration and the second limiting duration. In addition, the first processing unit 106 checks whether the positive matches of 100 digital signature values for unsupervised detection of the one or more advertisements is in a required sequence and order.

The first processing unit 106 checks for the degree of match of the pre-defined range of number of bits of the first pre-defined number of signature values. In an example, the degree of match of 640 bits (32 Bits×20 digital signature values) of the generated set of digital signature values with stored 640 digital signature values is 620 bits. In such case, the first processing unit 106 flags the probabilistic match as the positive match. In another example, the degree of match of 640 bits of the generated set of digital signature values with stored 640 digital signature values is 550 bits. In such case, the first processing unit 106 flags the probabilistic match as the negative match. In an embodiment of the present disclosure, the pre-defined range of number of bits is 0-40.

The first processing unit 106 generates one or more prominent frequencies and one or more prominent amplitudes from extracted first set of audio fingerprints. The first processing unit 106 fetches a sample rate of first set of audio fingerprints. The sample rate is divided by a pre-defined bin size set for the audio. The division of the sample rate by the pre-defined bin size provides the data point. Further, the first processing unit 106 performs fast fourier transform (hereinafter "FFT") on each bin size of the audio to obtain the one or more prominent frequencies and the one or more prominent amplitudes. The first processing unit 106 compares the one or more prominent frequencies and the one or more prominent amplitudes with a stored one or more prominent frequencies and a stored one or more prominent amplitudes.

Going further, the first processing unit 106 fetches the corresponding video and audio clip associated to the probabilistically matched digital signature values. The first database 106a and the first processing unit 106 are associated with the administrator 110. The administrator 110 is associated with a display device and a control and input interface. In addition, the display device is configured to display a graphical user interface (hereinafter "GUI") of an installed operating system. The administrator 110 checks for the presence of the audio and the video clip manually in the master database 112. The administrator 110 decides whether the audio clip and the video clip correspond to a new advertisement. The administrator 110 tags each audio clip and the video clip with a tag. The tag corresponds to a brand name associated with a detected advertisement. The administrator 110 stores the metadata of the probabilistically matched digital fingerprint values in the master database 112.

In addition, the first processing unit 106 reports a positively matched digital signature values corresponding to each detected advertisement in a reporting database present in the first database 106a. The first processing unit 106 discards any detected advertisement already reported in the reporting database.

The second processing unit 108 includes a second central processing unit and associated peripherals for supervised detection of the one or more advertisements (also shown in FIG. 1C). The second processing unit 108 is connected to a second database 108a. Further, the second processing unit 108 receives the live feed associated with the media content broadcasted on the channel of the one or more channels. In an embodiment of the present disclosure, the second processing unit 108 receives the live feed associated with the media content broadcasted on each of the one or more channels. Further, the live feed is received in the real time (as explained above in the patent application).

Accordingly, the second processing unit 108 processes the received media content in the real time. In an embodiment of the present disclosure, the second processing unit 108 processes each video frame of the plurality of video frames in the media content. In an embodiment of the present disclosure, the second processing unit 108 analyzes each video frame of the plurality of video frames. Further, each video frame of the plurality of video frames is associated with the set of parameters. The set of parameters correspond to the one or more characteristics of each video frame of the plurality of video frames. Also, each video frame of the plurality of video frame is made of various pixels.

In an embodiment of the present disclosure, the second processing unit 108 analyses the one or more characteristics associated with each video frame of the plurality of video frames. The analysis is done in the real time. Also, the analysis is done sequentially. The one or more characteristics analyzed by the second processing unit 108 include the frame height, the frame width, the frame rate, the value of each color pixel in the video frame and the like. Further, the number of pixels in the corresponding video frame is calculated by multiplying the corresponding frame height with the corresponding frame width.

In an embodiment of the present disclosure, the second processing unit 108 calculates the one or more characteristics of each video frame of the plurality of video frames. In an embodiment of the present disclosure, the one or more characteristics are derived by performing the digital fingerprinting algorithm (as stated above in the patent application). In an embodiment of the present disclosure, the derivation is done for performing the normalization for each video frame of the plurality of video frames (explained below in the patent application). In an embodiment of the present disclosure, the second processing unit 108 calculates the value of red (R), green (G) and blue (B) for each pixel making up the video frame (as described above in the patent application). In addition, the value for red (R), green (G) and blue (B) for each pixel is stored on a continuous basis in the second database 108a.

Going further, the second processing unit 108 normalizes each frame of the pre-determined number of frames of the video. The video corresponds to the broadcasted media content on the channel of the one or more channels. In an embodiment of the present disclosure, the pre-determined number of frames corresponds to the plurality of video frames. In an embodiment of the present disclosure, the second processing unit 108 normalizes each of the plurality of video frames of the video of the media content. The normalization of each frame of the pre-determined number of frames is done in the real time. In an embodiment of the present disclosure, the pre-determined number of frames is based on the frame rate.

In an embodiment of the present disclosure, the second processing unit 108 processes the pre-determined number of frames in the pre-determined interval of broadcast. For example, the second processing unit 108 processes 25 frames in one second. Further, the normalization of each frame of the pre-determined number of frames is done for standardizing the one or more characteristics for each frame of the pre-determined number of frames. The standardization is done by adjusting the one or more characteristics associated with each video frame to the standard set of values for the one or more characteristics.

The standard set of values for the one or more characteristics corresponds to the pre-determined values of the one or more characteristics for the normalization of the pre-determined number of frames. In an embodiment of the present disclosure, the standard set of values is pre-stored in the first database 108*a*. In an embodiment of the present disclosure, the normalization of each frame is done based on the histogram normalization and the histogram equalization. The normalization of each frame is done by adjusting the luminous intensity value of each pixel to the desired luminous intensity value (as explained above in the patent application).

Further, in an embodiment of the present disclosure, the second processing unit 108 adjusts the red, green and blue values of each pixel in each frame in real time. In addition, the second processing unit 108 adjusts the values in the pre-defined range. Also, the adjustment is done for attaining the desired luminous intensity value (as stated above in the patent application). In an embodiment of the present disclosure, the pre-defined range is pre-known to the second processing unit 108. The second processing unit 108 checks the values of red, green and blue for each pixel making each frame of the pre-determined number of frames. Accordingly, the second processing unit 108 adjusts the values if the values do not lie in the pre-defined range (as described above in the patent application).

In an embodiment of the present disclosure, the second processing unit 108 adjusts the values by multiplying each corresponding red, green and blue value of each pixel with the fraction number (as explained above in the patent application). Accordingly, the second processing unit 108 stores each normalized frame of the pre-determined number of frames in the second database 108*a*. Going further, the second processing unit 108 scales each frame of the corresponding pre-determined number of frames of the video to the pre-defined scale. Each frame corresponds to the broadcasted media content on the channel. In addition, the scaling of each frame is done by keeping the constant aspect ratio. In an embodiment of the present disclosure, the pre-defined scale of each frame is 640×480 pixels. In another embodiment of the present disclosure, the pre-defined scale of each frame may vary (as stated above in the patent application).

Further, the second processing unit 108 determines the frame height and the frame width of each frame of the pre-determined number of frames. Accordingly, the second processing unit 108 trims the first pre-defined region and the second pre-defined region of each frame by the pre-defined percentage of the frame width, the frame height and the pre-defined number of pixels in each frame. In an embodiment of the present disclosure, the trimming of each frame is done based on calculation of the pre-determined height and the pre-determined width. The pre-determined height and the pre-determined width correspond to the first pre-defined region having a channel logo and the second pre-defined region having a ticker (as described above in the patent application).

The trimming is done for maintaining the constant aspect ratio. In an embodiment of the present disclosure, the constant aspect ratio is 4:3. In another embodiment of the present disclosure, the constant aspect ratio may vary. In an embodiment of the present disclosure, the pre-defined percentage of the frame width, the frame height and the pre-defined number of pixels is 30 percent. In another embodiment of the present disclosure, the pre-defined percentage of the frame width, the frame height and the pre-defined number of pixels may vary (as stated above in the patent application). Accordingly, the second processing unit 108 stores each of the normalized, scaled and trimmed frame of the pre-determined number of frames in the second database 108*a*.

Further, the second processing unit 108 is programmed to perform the extraction of the first set of audio fingerprints and the first set of video fingerprints corresponding to each trimmed frame of the pre-determined number of frames. The pre-determined number of frames corresponds to the media content broadcasted on the channel. The first set of video fingerprints and the first set of audio fingerprints are extracted sequentially in the real time. The extraction of the first set of video fingerprints is done by sequentially extracting the one or more prominent fingerprints corresponding to the one or more prominent frames for the pre-defined interval of broadcast. In addition, the second processing unit 108 extracts the first set of audio fingerprints and the first set of video fingerprints for each of the normalized, scaled and trimmed frames.

In an embodiment of the present disclosure, the one or more prominent frames correspond to prominent normalized, scaled and trimmed frames. In an embodiment of the present disclosure, the extraction is done immediately after the trimming of each frame of the pre-determined number of frames. In an embodiment of the present disclosure, the extraction is done after the second processing unit 108 selects the one or more prominent frames from the normalized, scaled and trimmed frames.

Furthermore, each of the one or more prominent fingerprints corresponds to the prominent frame having sufficient contrasting features compared to the adjacent prominent frame. For example, let us suppose that the second processing unit 108 selects 6 prominent frames per second from 25 frames per second. Each pair of adjacent frames of the 6 prominent frames will have evident contrasting features. The second processing unit 108 generates the set of digital signature values corresponding to the extracted set of video fingerprints. The second processing unit 108 generates each digital signature value of the set of digital signature values by dividing each prominent frame of the one or more prominent frames into the pre-defined number of blocks. In an embodiment of the present disclosure, the predefined number of block is 16 (4×4). In another embodiment of the present disclosure, the pre-defined number of blocks is any suitable number (as stated above in the patent application).

The second processing unit 108 gray-scales each block of each prominent frame of the one or more prominent frames. The second processing unit 108 calculates the first bit value and the second bit value for each block of the prominent frame. The first bit value and the second bit value are calculated from comparison of the mean and the variance for the pre-defined number of pixels with the corresponding mean and variance for the master frame. The master frame is present in the master database 112. The second processing unit 108 assigns the first bit value and the second bit with the binary 0 when the mean and the variance for each block are less the corresponding mean and variance of each master frame. The second processing unit 108 assigns the first bit value and the second bit value with the binary 1 when the mean and the variance for each block is greater than the corresponding mean and variance of each master frame.

The second processing unit 108 obtains the 32 bit digital signature value corresponding to each prominent frame. The 32 bit digital signature value is obtained by sequentially arranging the first bit value and the second bit value for each block of the pre-defined number of blocks of the prominent frame. The second processing unit 108 stores each digital signature value corresponding to each prominent frame of the one or more prominent frames in the second database 108a. The digital signature value corresponds to the one or more programs and the one or more advertisements.

The second processing unit 108 performs the supervised detection of the one or more advertisements. The second processing unit 108 probabilistically matches the second pre-defined number of digital signature values with the stored set of digital signature values present in the master database 112. The second pre-defined number of digital signature values corresponds to the second pre-defined number of prominent frames of the real time broadcasted media content. The probabilistic match is performed for the set of digital signature values by utilizing the sliding window algorithm. The second processing unit 108 determines the positive match in the probabilistically matching of the second pre-defined number of digital signature values with the stored set of digital signature values. The stored set of digital signal values is present in the master database 112. In an embodiment of the present disclosure, the second pre-defined number of digital signature values of the set of digital signature values for the supervised detection of the one or more advertisements is 6. In another embodiment of the present disclosure, the second pre-defined number of digital signature values is selected based on optimal processing capacity and performance of the second processing unit 108.

In an example, let us suppose that the second processing unit 108 stores 300 digital signature values corresponding to 300 prominent frames in the second database 108a for 10 seconds of the media content. The second processing unit 108 probabilistically matches 6 digital signature values corresponding to $101^{st}$ to $107^{st}$ prominent frame with each 6 digital signature values corresponding to 300 previously stored prominent frames. The 300 previously stored prominent frames are present in the master database 112.

In another example, suppose 300 digital signature values from $500^{th}$ prominent frame to $800^{th}$ prominent frame gives a positive match with a stored $150^{th}$ frame to $450^{th}$ frame in the master database 112. The second processing unit 108 checks whether the number of positive matches is in the pre-defined range of positive matches and the positive matches correspond to media content in the first limiting duration and the second limiting duration. In addition, the second processing unit 108 checks whether the positive matches of 300 digital signature values for supervised detection of the one or more advertisements is in the required sequence and order.

The second processing unit 108 checks for the degree of match of the pre-defined range of number of bits of the second pre-defined number of signature values. In an example, the degree of match of 192 bits of the generated set of digital signature values with stored 192 digital signature values is 185 bits. In such case, the second processing unit 108 flags the probabilistic match as the positive match. In another example, the degree of match of 192 bits of the generated set of digital signature values with stored 192 digital signature values is 179 bits. In such case, the second processing unit 108 flags the probabilistic match as the negative match. In an embodiment of the present disclosure, the pre-defined range of number of bits is 0-12.

The second processing unit 108 compares the one or more prominent frequencies and the one or more prominent amplitudes with the stored one or more prominent frequencies and the stored one or more prominent amplitudes. The one or more prominent frequencies and the one or more prominent amplitudes correspond to the extracted first set of audio fingerprints. In an embodiment of the present disclosure, the administrator 110 manually checks whether each supervised advertisement detected is an advertisement or a program. In an embodiment of the present disclosure, the advertisement detection system 104 reports a frequency of each advertisement broadcasted for a first time and a frequency of each advertisement broadcasted repetitively. In another embodiment of the present disclosure, the administrator 110 reports the frequency of each advertisement broadcasted for the first time and the frequency of each advertisement broadcasted repetitively.

Further, the master database 112 is present in a master server. The master database 112 includes a plurality of digital video and audio fingerprint records and every signature value corresponding to each previously detected and newly detected advertisement. The master database 112 is connected to the advertisement detection system 104. In an embodiment of the present disclosure, the master server is present in a remote location. In another embodiment of the present disclosure, the master server is present locally with the advertisement detection system 104. Further, the advertisement detection system 104 stores the generated set of digital signature values, the first set of audio fingerprints and the first set of video fingerprints in the first database 106a and the second database 108a. Furthermore, the advertisement detection system 104 updates the first metadata manually in the master database 112 for the unsupervised detection of the one or more advertisements. The first metadata includes the set of digital signature values and the first set of video fingerprints.

In an embodiment of the present disclosure, the media content broadcasted on another channel uses a pre-defined regional language in the audio. In another embodiment of the present disclosure, the media content broadcasted on another channel uses a standard language accepted nationally. In an embodiment of the present disclosure, the broadcast reception device 102 receives the media content corresponding to the broadcasted content having audio in the pre-defined regional language or the standard language. The media content corresponds to another channel.

In an embodiment of the present disclosure, the first processing unit 106 extracts the first set of audio fingerprints and the first set of video fingerprints corresponding to another channel. The first processing unit 106 extracts the pre-defined number of prominent frames and generates pre-defined number of digital signature values. The first processing unit 106 performs the temporal recurrence algorithm to detect a new advertisement. In an embodiment of the present disclosure, the first processing unit 106 generates prominent frequencies and prominent amplitudes of the audio. In another embodiment of the present disclosure, the first processing unit 106 discards the audio from the media content. In an embodiment of the present disclosure, the first processing unit 106 probabilistically matches the one or more prominent frequencies and the one or more prominent amplitudes with stored prominent frequencies and stored prominent amplitudes in the first database 106a.

The stored prominent frequencies and the stored prominent amplitudes correspond to a regional channel having audio in the pre-defined regional language or standard language. In an embodiment of the present disclosure, the standard language is English. In another embodiment of the present disclosure, the first processing unit gives precedence to results of probabilistic match of video fingerprints than to the audio fingerprints. In an embodiment of the present disclosure, the administrator 110 manually tags the detected advertisement broadcasted in the pre-defined regional language or the standard language. In another embodiment of the present disclosure, the advertisement detection system 104 automatically tags the detected advertisement broadcasted in the pre-defined regional language or the standard language.

In an embodiment of the present disclosure, the second processing unit 108 extracts the first set of audio fingerprints and the first set of video fingerprints corresponding to another channel. The second processing unit 108 extracts the pre-defined number of prominent frames and generates pre-defined number of digital signature values. The second processing unit 108 performs probabilistic matching of digital signature values corresponding to the video with the stored digital signature values in the master database 112 detect a repeated advertisement. In an embodiment of the present disclosure, the second processing unit 108 generates the one or more prominent frequencies and the one or more prominent amplitudes of the audio. In another embodiment of the present disclosure, the second processing unit 108 discards the audio from the media content.

In an embodiment of the present disclosure, the master database 112 includes the one or more advertisements corresponding to a same advertisement in every regional language. In another embodiment of the present disclosure, the master database 112 includes the advertisement in a specific national language. In embodiment of the present disclosure, the second processing unit 108 probabilistically matches the one or more prominent frequencies and the one or more prominent amplitudes with stored prominent frequencies and stored prominent amplitudes. The stored prominent frequencies and the stored prominent amplitudes correspond to a regional channel having audio in the pre-defined regional language or standard language in the master database. In an embodiment of the present disclosure, the standard language is English. In another embodiment of the present disclosure, the second processing unit 108 gives precedence to results of probabilistic match of video fingerprints than to the audio fingerprints.

It may be noted that in FIG. 1A, FIG. 1B and FIG. 1C, the system 100 includes the broadcast reception device 102 for decoding one channel; however, those skilled in the art would appreciate the system 100 includes more number of broadcast reception devices for decoding more number of channels. It may be noted that in FIG. 1A, FIG. 1B and FIG. 1C, the system 100 includes the advertisement detection system 104 for the supervised and the unsupervised detection of the one or more advertisement corresponding to one channel; however, those skilled in the art would appreciate that the advertisement detection system 104 detects the one or more advertisements corresponding to more number of channels. It may be noted that in FIG. 1A, FIG. 1B and FIG. 1C, the administrator 110 manually checks each newly detected advertisement in the master database 112; however, those skilled in the art would appreciate that the advertisement detection system 104 automatically checks for each advertisement in the master database 112.

FIG. 2 illustrates a block diagram 200 of the advertisement detection system 104, in accordance with various embodiments of the present disclosure. The block diagram 200 describes the advertisement detection system 104 configured for the hardware agnostic detection of the one or more advertisements.

The block diagram 200 of the advertisement detection system 104 includes a normalization module 202, a scaling module 204, a trimming module 206, an extraction module 208, a generation module 210, a storage module 212, a detection module 214 and an updating module 216. The normalization module 202 normalizes each frame of the pre-determined number of frames of the video corresponding to the broadcasted media content on the channel. In an embodiment of the present disclosure, the normalization module 202 normalizes each of the plurality of video frames of the video of the media content. The normalization of each frame of the pre-determined number of frames is done in the real time. In an embodiment of the present disclosure, the normalization of each frame is done based on the histogram normalization and the histogram equalization. The normalization of each frame is done by adjusting the luminous intensity value of each pixel to the desired luminous intensity value (as stated above in the detailed description of the FIG. 1A).

The scaling module 204 scales each frame of the corresponding pre-determined number of frames of the video to the pre-defined scale. Moreover, the scaling of each frame is done by keeping a constant aspect ratio. In an embodiment of the present disclosure, the pre-defined scale of each frame is 640×480 pixels. In another embodiment of the present disclosure, the pre-defined scale of each frame may vary. Further, the aspect ratio corresponds to a relationship between the frame height and the frame width associated with each corresponding frame of the pre-determined number of frames (as described above in the detailed description of the FIG. 1A).

The aspect ratio for each frame of the pre-determined number of frames is the ratio of the frame width to the frame height. In general, the aspect ratio for higher resolution media content is higher than the aspect ratio for lower resolution media content (as stated above in the detailed description of the FIG. 1A). Further, the trimming module 206 trims the first pre-defined region and the second pre-defined region of each frame by the pre-defined percentage of the frame width, the frame height and the pre-defined number of pixels in each frame.

In an embodiment of the present disclosure, the trimming of each frame is done based on calculation of the pre-determined height and the pre-determined width. The pre-determined height and the pre-determined width correspond to the first pre-defined region having the channel logo and the second pre-defined region having the ticker. In addition, the pre-determined height corresponds to the frame height and the pre-determined width corresponds to the frame width. Further, the first pre-defined region corresponds to a top horizontal portion of each frame and the second pre-defined region corresponds to a bottom horizontal portion of each frame. In an embodiment of the present disclosure, the trimming is done based on the pre-defined scale. The pre-defined percentage of the frame width, the frame height and the pre-defined number of pixels in each frame is determined based on the pre-defined scale (as previously described above in the detailed description of the FIG. 1A).

Going further, the extraction module 208 extracts the first set of audio fingerprints and the first set of video fingerprints corresponding to each trimmed frame of the pre-determined number of frames. The pre-determined number of frames corresponds to the media content broadcasted on the channel. The first set of audio fingerprints and the first set of video fingerprints are extracted sequentially in the real time. In addition, the extraction module 208 extracts the first set of audio fingerprints and the first set of video fingerprints for each of the normalized, scaled and trimmed frames (as mentioned in the detailed description of the FIG. 1A).

Further, the generation module 210 generates the set of digital signature values corresponding to the extracted set of video fingerprints. The generation module 210 generates each digital signature value of the set of digital signature values by dividing and grayscaling each prominent frame into the pre-defined number of blocks. Further, the generation module 210 calculates and obtains each digital signature value corresponding to each block of the prominent frame (as described in the detailed description of the FIG. 1A). The generation module 210 divides each prominent frame of the one or more prominent frames into the pre-defined number of blocks (as shown in detailed description of FIG. 1A). Further, the generation module 210 grayscales each block of each prominent frame of the one or more prominent frames. Furthermore, the generation module 210 calculates the first bit value and the second bit value for each block of the prominent frame (as described in the detailed description of FIG. 1A). Accordingly, the generation module 210 obtains the 32 bit digital signature value corresponding to each prominent frame (as described in detailed description of FIG. 1A).

The storage module 212 stores the generated set of digital signature values, the first set of audio fingerprints and the first set of video fingerprints in the first database 106a and the second database 108a (as described in detailed description of FIG. 1A). Further, the detection module 214 detects the one or more advertisements broadcasted on the channel. The detection module 214 includes an unsupervised detection module 214a and a supervised detection module 214b. The unsupervised detection module 214a detects a new advertisement through unsupervised machine learning. The unsupervised detection module 214a probabilistically matches the first pre-defined number of digital signature values corresponding to the pre-defined number of prominent frames with the stored set of digital signature values (as described in detailed description of FIG. 1A).

Furthermore, the unsupervised detection module 214a compares the one or more prominent frequencies and the one or more prominent amplitudes of the extracted first set of audio fingerprints (as described in detailed description of FIG. 1A). In addition, the unsupervised detection module 214a determines the positive probabilistic match of the pre-defined number of prominent frames based on the pre-defined condition (as described in the detailed description of FIG. 1A). Moreover, the unsupervised detection module 214a fetches the video and the audio clip corresponding to the probabilistically matched digital signature values (as described in the detailed description of FIG. 1A). Further, the unsupervised detection module 214a checks presence of the audio and the video clip manually in the master database 112 (as described in detailed description of FIG. 1A). In addition, the unsupervised detection module 214a reports the positively matched digital signature values corresponding to the advertisement of the one or more advertisements in the reporting database present in the first database 106a (as described in the detailed description of FIG. 1A).

The supervised detection module 212 probabilistically matches the second pre-defined number of digital signature values with the stored set of digital signature values present in the master database 112 (as described above in the detailed description of FIG. 1A). Further, the supervised detection module 212 compares the one or more prominent frequencies and the one or more prominent amplitudes with the stored one or more prominent frequencies and the stored one or more prominent amplitudes (as described in the detailed description of FIG. 1A). In addition, the supervised detection module 212 determines the positive match in the probabilistically matching of the second pre-defined number of digital signature values with the stored set of digital signature values in the master database 112. Furthermore, the supervised detection module 212 determines the positive match from the comparison of the one or more prominent frequencies with the stored one or more prominent frequencies (as described in the detailed description of FIG. 1A).

Going further, the updating module 216 updates the first metadata manually in the master database 112 for the unsupervised detection of the one or more advertisements. The first metadata includes the set of digital signature values and the first set of video fingerprints corresponding to the detected advertisement (as described in the detailed description of FIG. 1A).

FIG. 3 illustrates a flow chart 300 for the hardware agnostic detection of the one or more advertisements broadcasted across the one or more channels, in accordance with various embodiments of the present disclosure. It may be noted that to explain the process steps of the flowchart 300, references will be made to the system elements of the FIG. 1A, FIG. 1B, FIG. 1C and FIG. 2.

The flowchart 300 initiates at step 302. At step 304, the normalization module 202 normalizes each frame of the pre-determined number of frames of the video corresponding to the broadcasted media content on the channel. The normalization of each frame is done based on the histogram normalization and the histogram equalization. The normalization of each frame is done by adjusting the luminous intensity value of each pixel to the desired luminous intensity value. At step 306, the scaling module 204 scales each frame of the corresponding pre-determined number of frames of the video to the pre-defined scale. Moreover, the scaling of each frame is done by keeping a constant aspect ratio. In an embodiment of the present disclosure, the pre-defined scale of each frame is 640×480 pixels. In another embodiment of the present disclosure, the pre-defined scale of each frame may vary. At step 308, the trimming module 206 trims the first pre-defined region and the second pre-defined region of each frame by the pre-defined percentage of the frame width, the frame height and the pre-defined number of pixels in each frame. The trimming of each frame is done based on calculation of the pre-determined height and the pre-determined width. The pre-determined height and the pre-determined width correspond to the first pre-defined region having the channel logo and the second pre-defined region having the ticker. At step 310, the extraction module 208 extracts the first set of audio fingerprints and the first set of video fingerprints for each trimmed frame of the pre-determined number of frames. At step 312, the generation module 210 generates the set of digital signature values corresponding to the first set of video fingerprints. The flow chart 300 terminates at step 314.

It may be noted that the flowchart 300 is explained to have above stated process steps; however, those skilled in the art would appreciate that the flowchart 300 may have more/less number of process steps which may enable all the above stated embodiments of the present disclosure.

FIG. 4 illustrates a block diagram of a computing device 400, in accordance with various embodiments of the present disclosure. The computing device 400 includes a bus 402 that directly or indirectly couples the following devices: memory 404, one or more processors 406, one or more presentation components 408, one or more input/output (I/O) ports 410, one or more input/output components 412, and an illustrative power supply 414. The bus 402 represents what may be one or more buses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary computing device 400 that can be used in connection with one or more embodiments of the present invention. Distinction is not made between such categories as "workstation," "server," "laptop," "hand-held device," etc., as all are contemplated within the scope of FIG. 4 and reference to "computing device."

The computing device 400 typically includes a variety of computer-readable media. The computer-readable media can be any available media that can be accessed by the computing device 400 and includes both volatile and nonvolatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 404 includes computer-storage media in the form of volatile and/or nonvolatile memory. The memory 404 may be removable, non-removable, or a combination thereof. Exemplary hardware devices include solid-state memory, hard drives, optical-disc drives, etc. The computing device 400 includes one or more processors that read data from various entities such as memory 404 or I/O components 412. The one or more presentation components 408 present data indications to a user or other device. Exemplary presentation components include a display device, speaker, printing component, vibrating component, etc. The one or more I/O ports 410 allow the computing device 400 to be logically coupled to other devices including the one or more I/O components 412, some of which may be built in. Illustrative components include a microphone, joystick, game pad, satellite dish, scanner, printer, wireless device, etc.

The present disclosure has numerous advantages over the prior art. The present disclosure provides a novel method to detect any new advertisement running for the first time on any television channel. The advertisements are detected robustly and dedicated supervised and unsupervised central processing unit (hereinafter "CPU") are installed. Further, the present disclosure provides a method and system that is economic and provides high return of investment. The detection of each repeated advertisement on supervised CPU and each new advertisement on unsupervised CPU significantly saves processing power and saves significant time. The disclosure provides a cost efficient solution to a scaled mapping and database for advertisement broadcast. The present disclosure removes the hardware dependency for the detection of the one or more advertisements.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A computer-implemented method for a hardware agnostic detection of one or more advertisements broadcasted across one or more channels, the computer-implemented method comprising:

normalizing, at an advertisement detection system with a processor, each frame of a pre-determined number of frames of a video corresponding to a broadcasted media content on a channel, wherein each frame being normalized based on a histogram normalization and histogram equalization and wherein each frame being normalized by adjusting luminous intensity value of each pixel to a desired luminous intensity value;

scaling, at the advertisement detection system with the processor, each frame of the corresponding pre-determined number of frames of the video to a pre-defined scale corresponding to the broadcasted media content on the channel, wherein the scaling of each frame being done by keeping a constant aspect ratio;

trimming, at the advertisement detection system with the processor, a first pre-defined region and a second pre-defined region of each frame by a pre-defined percentage of a frame width, a frame height and a pre-defined number of pixels in each frame, wherein each frame being trimmed based on calculation of a pre-determined height and a pre-determined width corresponding to the first pre-defined region having a channel logo and the second pre-defined region having a ticker;

extracting, at the advertisement detection system with the processor, a first set of audio fingerprints and a first set of video fingerprints corresponding to each trimmed frame of the pre-determined number of frames corresponding to the media content broadcasted on the channel, wherein the first set of audio fingerprints and the first set of video fingerprints being extracted sequentially in real time; and generating, at the advertisement detection system with the processor, a set of digital signature values corresponding to the first set of video fingerprints, wherein the generation of each digital signature value of the set of digital signature values being done by:

dividing each prominent frame of one or more prominent frames into a pre-defined number of blocks, wherein each block of the pre-defined number of blocks having a pre-defined number of pixels;

grayscaling each block of each prominent frame of the one or more prominent frames;

calculating a first bit value and a second bit value for each block of the prominent frame, wherein the first bit value and the second bit value being calculated from comparing a mean and a variance for the pre-defined number of pixels in each block of the prominent frame with a corresponding mean and variance for a master frame in a master database; and obtaining a 32 bit digital signature value corresponding to each prominent frame, wherein the 32 bit digital signature value being obtained by sequentially arranging the first bit value and the second bit value for each block of the pre-defined number of blocks of the prominent frame.

2. The computer-implemented method as recited in claim 1, wherein the pre-defined scale of each frame being 640× 480 pixels.

3. The computer-implemented method as recited in claim 1, wherein the pre-defined percentage of the frame width, the frame height and the pre-defined number of pixels being 30 percent.

4. The computer-implemented method as recited in claim 1, wherein the first bit value and the second bit value being assigned a binary 0 when the mean and the variance for each block of the prominent frame being less than the corresponding mean and variance of each master frame.

5. The computer-implemented method as recited in claim 1, wherein the first bit value and the second bit value being assigned a binary 1 when the mean and the variance for each block of the prominent frame being greater than the corresponding mean and variance of each master frame.

6. The computer-implemented method as recited in claim 1, further comprising detecting, at the advertisement detection system with the processor, the one or more advertisements broadcasted across the one or more channels, wherein the detection of the one or more advertisement being a supervised detection and an unsupervised detection.

7. The computer-implemented method as recited in claim 6, wherein the unsupervised detection of the one or more advertisements being done by:

probabilistically matching a first pre-defined number of digital signature values corresponding to a pre-defined number of prominent frames of a real time broadcasted media content with a stored set of digital signature values present in a first database, wherein the probabilistic matching being performed for the set of digital signature values by utilizing a sliding window algorithm;

comparing one or more prominent frequencies and one or more prominent amplitudes of the extracted first set of audio fingerprints;

determining a positive probabilistic match of the pre-defined number of prominent frames based on a pre-defined condition;

fetching a video and an audio corresponding to probabilistically matched digital signature values;

checking presence of the audio and the video manually in the master database; and reporting a positively matched digital signature values corresponding to an advertisement of the one or more advertisements in a reporting database present in the first database.

8. The computer-implemented method as recited in claim 7, wherein the pre-defined condition comprises a pre-defined range of positive matches corresponding to the probabilistically matched digital signature values, a pre-defined duration of media content corresponding to the positive match, a sequence and an order of the positive matches and a degree of match of a pre-defined range of number of bits of the first pre-defined number of digital signature values.

9. The computer-implemented method as recited in claim 1, further comprising, updating, at the advertisement detection system with the processor, a first metadata comprising a set of digital signature values and a first set of video fingerprints corresponding to a detected advertisement manually in the master database.

10. The computer-implemented method as recited in claim 6, wherein the supervised detection of the one or more advertisements being done by:

probabilistically matching a second pre-defined number of digital signature values corresponding to a pre-defined number of prominent frames of a real time broadcasted media content with a stored set of digital signature values present in the master database, wherein the probabilistic matching being performed for the set of digital signature values by utilizing the sliding window algorithm;

comparing one or more prominent frequencies and one or more prominent amplitudes corresponding to the extracted first set of audio fingerprints with a stored one or more prominent frequencies and a stored one or more prominent amplitudes; and determining a positive match in the probabilistically matching of the second pre-defined number of digital signature values with the stored set of digital signature values in the master database and comparing of the one or more prominent frequencies and the one or more prominent amplitudes corresponding to the extracted first set of audio fingerprints with the stored one or more prominent frequencies and the stored one or more prominent amplitudes.

11. A computer system comprising:

one or more processors; and a memory coupled to the one or more processors, the memory for storing instructions which, when executed by the one or more processors, cause the one or more processors to perform a method for a hardware agnostic detection of one or more advertisements broadcasted across one or more channels, the method comprising:

normalizing, at an advertisement detection system, each frame of a pre-determined number of frames of a video corresponding to a broadcasted media content on a channel, wherein each frame being normalized based on a histogram normalization and histogram equalization and wherein each frame being normalized by adjusting luminous intensity value of each pixel to a desired luminous intensity value;

scaling, at the advertisement detection system, each frame of the corresponding pre-determined number of frames of the video to a pre-defined scale corresponding to the broadcasted media content on the channel, wherein the scaling of each frame being done by keeping a constant aspect ratio;

trimming, at the advertisement detection system, a first pre-defined region and a second pre-defined region of each frame by a pre-defined percentage of a frame width, a frame height and a pre-defined number of pixels in each frame, wherein each frame being trimmed based on calculation of a pre-determined height and a pre-determined width corresponding to the first pre-defined region having a channel logo and the second pre-defined region having a ticker;

extracting, at the advertisement detection system, a first set of audio fingerprints and a first set of video fingerprints corresponding to each trimmed frame of the pre-determined number of frames corresponding to the media content broadcasted on the channel, wherein the first set of audio fingerprints and the first set of video fingerprints being extracted sequentially in real time; and generating, at the advertisement detection system, a set of digital signature values corresponding to the first set of video fingerprints, wherein the generation of each digital signature value of the set of digital signature values being done by:

dividing each prominent frame of one or more prominent frames into a pre-defined number of blocks, wherein each block of the pre-defined number of blocks having a pre-defined number of pixels;

grayscaling each block of each prominent frame of the one or more prominent frames;

calculating a first bit value and a second bit value for each block of the prominent frame, wherein the first bit value and the second bit value being calculated from comparing a mean and a variance for the pre-defined number of pixels in each block of the prominent frame with a corresponding mean and variance for a master frame in a master database; and obtaining a 32 bit digital signature value corresponding to each prominent frame, wherein the 32 bit digital signature value being obtained by sequentially arranging the first bit value and the second bit value for each block of the pre-defined number of blocks of the prominent frame.

12. The computer system as recited in claim 11, wherein the pre-defined percentage of the frame width, the frame height and the pre-defined number of pixels being 30 percent.

13. The computer system as recited in claim 11, wherein the first bit value and the second bit value being assigned a binary 0 when the mean and the variance for each block of the prominent frame being less than the corresponding mean and variance of each master frame.

14. The computer system as recited in claim 11, wherein the first bit value and the second bit value being assigned a binary 1 when the mean and the variance for each block of the prominent frame being greater than the corresponding mean and variance of each master frame.

15. The computer system as recited in claim 11, further comprising detecting, at the advertisement detection system, the one or more advertisements broadcasted across the one or more channels, wherein the detection of the one or more advertisement being a supervised detection and an unsupervised detection.

16. The computer system as recited in claim 11, further comprising, updating, at the advertisement detection system, a first metadata comprising a set of digital signature values and a first set of video fingerprints corresponding to a detected advertisement manually in the master database.

17. A non-transitory computer-readable storage medium encoding computer executable instructions that, when executed by at least one processor, performs a method for a hardware agnostic detection of one or more advertisements broadcasted across one or more channels, the method comprising:

normalizing, at an advertisement detection system, each frame of a pre-determined number of frames of a video corresponding to a broadcasted media content on a channel, wherein each frame being normalized based on a histogram normalization and histogram equalization and wherein each frame being normalized by adjusting luminous intensity value of each pixel to a desired luminous intensity value;

scaling, at the advertisement detection system, each frame of the corresponding pre-determined number of frames of the video to a pre-defined scale corresponding to the broadcasted media content on the channel, wherein the scaling of each frame being done by keeping a constant aspect ratio;

trimming, at the advertisement detection system, a first pre-defined region and a second pre-defined region of each frame by a pre-defined percentage of a frame width, a frame height and a pre-defined number of pixels in each frame, wherein each frame being trimmed based on calculation of a pre-determined height and a pre-determined width corresponding to the first pre-defined region having a channel logo and the second pre-defined region having a ticker;

extracting, at the advertisement detection system, a first set of audio fingerprints and a first set of video fingerprints corresponding to each trimmed frame of the pre-determined number of frames corresponding to the media content broadcasted on the channel, wherein the first set of audio fingerprints and the first set of video fingerprints being extracted sequentially in real time; and generating, at the advertisement detection system, a set of digital signature values corresponding to the first set of video fingerprints, wherein the generation of each digital signature value of the set of digital signature values being done by:

dividing each prominent frame of one or more prominent frames into a pre-defined number of blocks, wherein each block of the pre-defined number of blocks having a pre-defined number of pixels;

grayscaling each block of each prominent frame of the one or more prominent frames;

calculating a first bit value and a second bit value for each block of the prominent frame, wherein the first bit value and the second bit value being calculated from comparing a mean and a variance for the pre-defined number of pixels in each block of the prominent frame with a corresponding mean and variance for a master frame in a master database; and obtaining a 32 bit digital signature value corresponding to each prominent frame, wherein the 32 bit digital signature value being obtained by sequentially arranging the first bit value and the second bit value for each block of the pre-defined number of blocks of the prominent frame.

18. The non-transitory computer readable storage medium as recited in claim 17, wherein the pre-defined percentage of the frame width, the frame height and the pre-defined number of pixels being 30 percent.

19. The non-transitory computer readable storage medium as recited in claim 17, further comprising detecting, at the computing device, the one or more advertisements broadcasted across the one or more channels, wherein the detection of the one or more advertisement being a supervised detection and an unsupervised detection.

20. The non-transitory computer readable storage medium as recited in claim 17, further comprising, updating, at the computing device, a first metadata comprising a set of digital signature values and a first set of video fingerprints corresponding to a detected advertisement manually in the master database.

* * * * *